(12) United States Patent
Eisel

(10) Patent No.: US 6,397,737 B1
(45) Date of Patent: Jun. 4, 2002

(54) NUTCRACKING APPARATUS

(76) Inventor: Joseph D. Eisel, 38015 Wheeler Rd., Dexter, OR (US) 97431

( * ) Notice: Subject to any disclaimer, the term of this patent is extended or adjusted under 35 U.S.C. 154(b) by 0 days.

(21) Appl. No.: 09/991,193

(22) Filed: Nov. 15, 2001

(51) Int. Cl.⁷ ................................................. A23N 5/00
(52) U.S. Cl. .............................. 99/571; 99/568; 99/572; 99/574; 99/579; 99/580
(58) Field of Search ........................... 99/568, 571–582, 99/617–622, 518, 519; 426/481–485; D7/680

(56) References Cited

U.S. PATENT DOCUMENTS

| | | | | |
|---|---|---|---|---|
| 1,342,692 A | * | 6/1920 | Pape ............................ | 99/575 |
| 2,144,841 A | * | 1/1939 | Glaser ......................... | 99/579 X |
| 2,316,025 A | * | 4/1943 | Smith .......................... | 99/574 X |
| 2,321,795 A | * | 6/1943 | Buckman ...................... | 99/575 |
| 2,549,881 A | * | 4/1951 | Berg et al. .................. | 99/579 X |
| 3,628,580 A | * | 12/1971 | Langston ..................... | 99/578 |
| 3,662,799 A | * | 5/1972 | Shaw ........................... | 99/574 |
| 4,201,126 A | * | 5/1980 | Evans .......................... | 99/579 |
| 4,218,968 A | * | 8/1980 | Livingston ................... | 99/617 X |
| D267,301 S | * | 12/1982 | Hunt ........................... | D7/680 |
| 4,438,688 A | | 3/1984 | Johnson | |
| 4,526,092 A | * | 7/1985 | Greenblatt et al. ........... | 99/575 |
| 4,614,033 A | | 9/1986 | Morris | |
| 4,793,248 A | * | 12/1988 | Frederikson et al. ....... | 99/575 X |
| 4,819,331 A | | 4/1989 | Joyama | |
| 4,848,220 A | | 7/1989 | Burdette et al. | |
| 5,024,148 A | | 6/1991 | Moses | |
| 5,076,158 A | | 12/1991 | Tippett | |
| 5,247,879 A | * | 9/1993 | Frederiksen et al. ......... | 99/575 |

* cited by examiner

Primary Examiner—Timothy P. Simone
(74) Attorney, Agent, or Firm—Robert E. Howard

(57) ABSTRACT

A nutcracking apparatus including a housing having opposing sidewalls. A hammer plate having an upper and lower portion is pivotally attached at its upper portion to the opposing sidewalls of the housing. A camshaft is positioned in abutment with a lower portion of the hammer plate, and a drive attached to an outer end of the cam shaft for effecting rotation thereof. An anvil plate having an upper and lower portion is spaced from the hammer plate is pivotally attached at its upper portion to the opposing sidewalls of the housing. A device is provided for moving the lower portion of the anvil plate towards and away from the lower portion of the hammer plate.

10 Claims, 3 Drawing Sheets

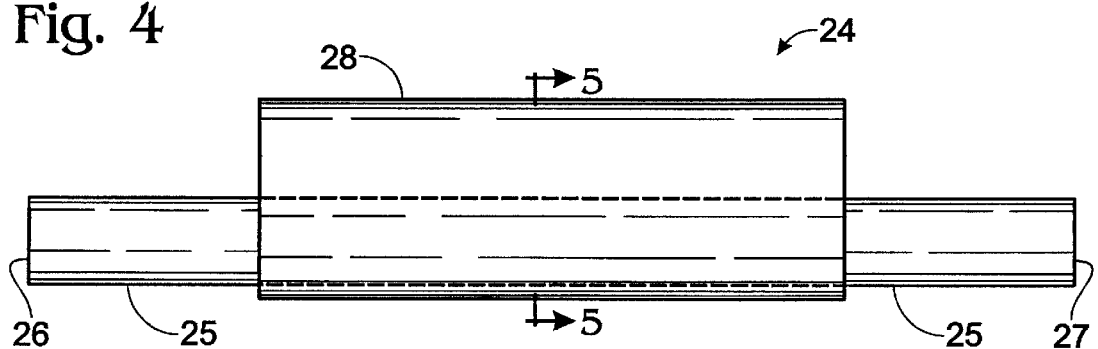
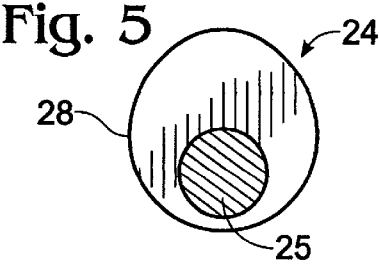
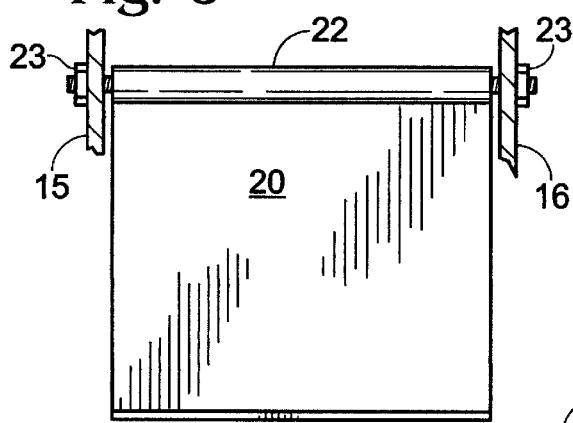
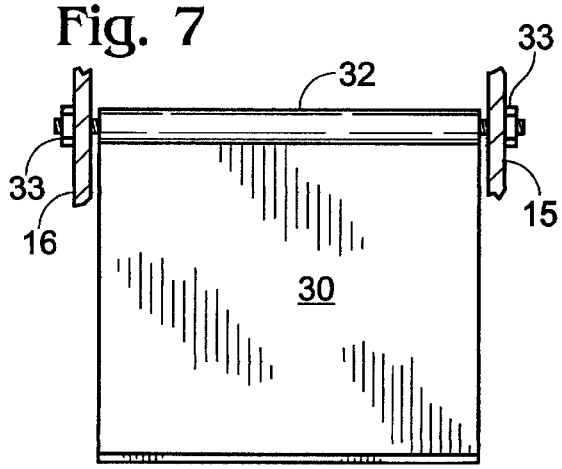

NUTCRACKING APPARATUS

BACKGROUND OF THE INVENTION

The present invention relates to a nutcracking apparatus for cracking nuts in bulk.

A number of mechanically driven or powered devices have been suggested for cracking nuts in bulk. Some such devices involve rotating drums or rotors spaced apart from a stator. The nuts to be cracked pass into the space between the rotor and stator and are cracked. However, such devices are complex, and they tend to damage substantial amounts of the nutmeat.

In addition, most such prior devices will not crack nuts of various sizes, and require that the nuts be segregated as to size before passing them through the nutcracking device.

SUMMARY OF THE PRESENT INVENTION

It is an object of the present invention to provide a nutcracking apparatus that minimizes cracking of the nutmeat.

It is a further object of the present invention to provide a nutcracking apparatus that cracks various size nuts at the same time without requiring segregation into different size ranges.

The apparatus of the present invention has a hopper for receiving uncracked nuts. The hopper communicates with a nutcracking housing. A hammer plate is located inside the housing and is attached at its upper end to a axle, the outer ends of which are pivotally attached to opposing sidewalls of the housing. The area adjacent the lower end of the hammer plate abuts a camshaft, the outer ends of the camshaft being journaled in bearings located outside of the opposing sidewalls of the housing.

An anvil plate is located inside the housing opposite the hammer plate. The anvil plate is attached at its upper end to an axle, the outer ends of which are pivotally attached to opposing sidewalls of the housing. The inner end of a jack screw is in contact with an area of the anvil plate adjacent its lower edge.

One outer end of the camshaft axle is attached to a flywheel. A flywheel drive means includes an electric motor having a small pulley located on the outer end of its drive shaft, the small pulley and the flywheel being connected by a pulley belt.

In operation, nuts to be cracked are placed into the hopper and fall between the hammer plate and anvil plate by gravity. The camshaft is rotated by the flywheel drive means and, since the camshaft abuts the lower edge of the hammer plate, causes the hammer plate to rapidly pivot back and forth toward and away from the anvil plate. The distance between the hammer plate and the anvil plate can be adjusted by the screw jack.

BRIEF DESCRIPTION OF THE DRAWINGS

FIG. 4 is a front elevation view of the camshaft;

FIG. 5 is a cross-section view of the camshaft taken along line 5—5 of FIG. 4;

FIG. 6 is a front elevation view of the hammer plate; and

FIG. 7 is a front elevation view of the anvil plate.

DESCRIPTION OF PREFERRED EMBODIMENTS

Figure 1:
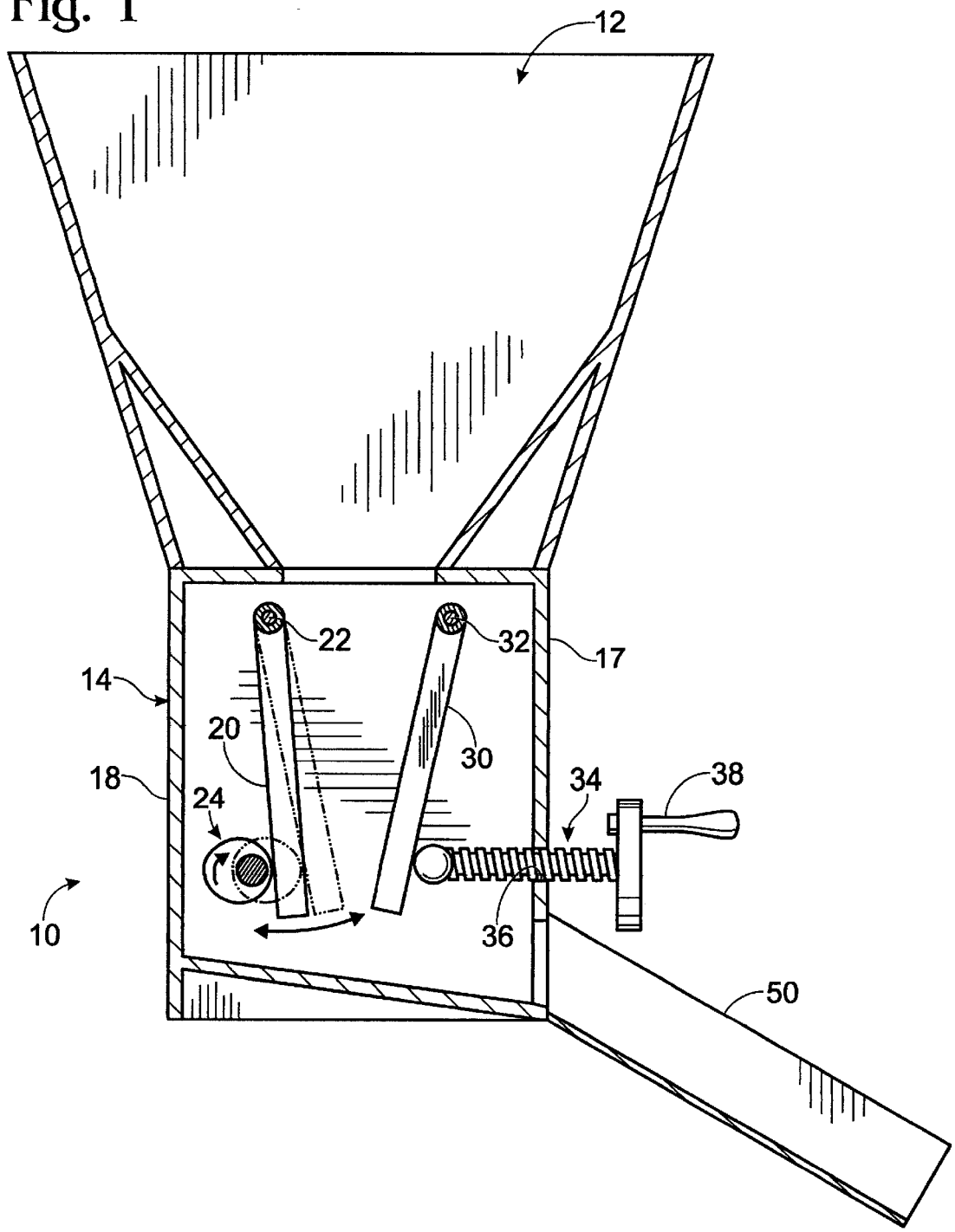
FIG. 1 is a left side elevation view, in cross-section, of the nut cracking apparatus of the present invention, shown without the flywheel drive means.
Figure 2:
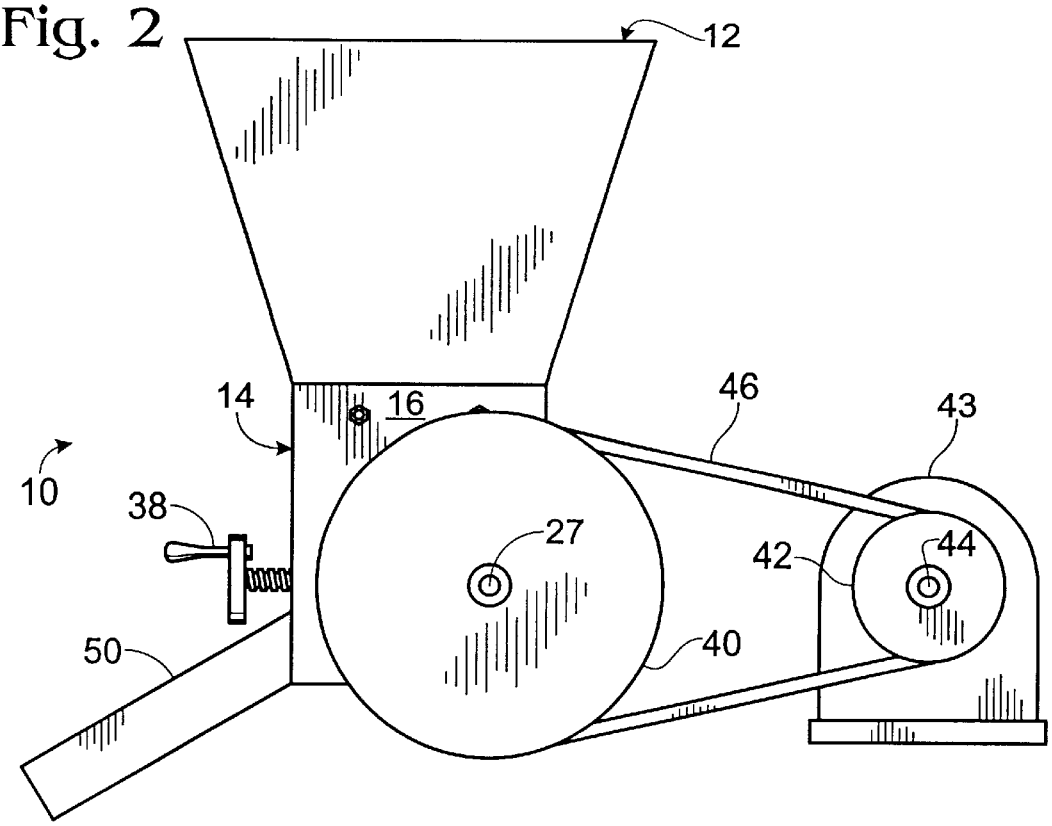
FIG. 2 is a right side elevation view of the nut cracking apparatus of the present invention including the flywheel drive means.
Figure 3:
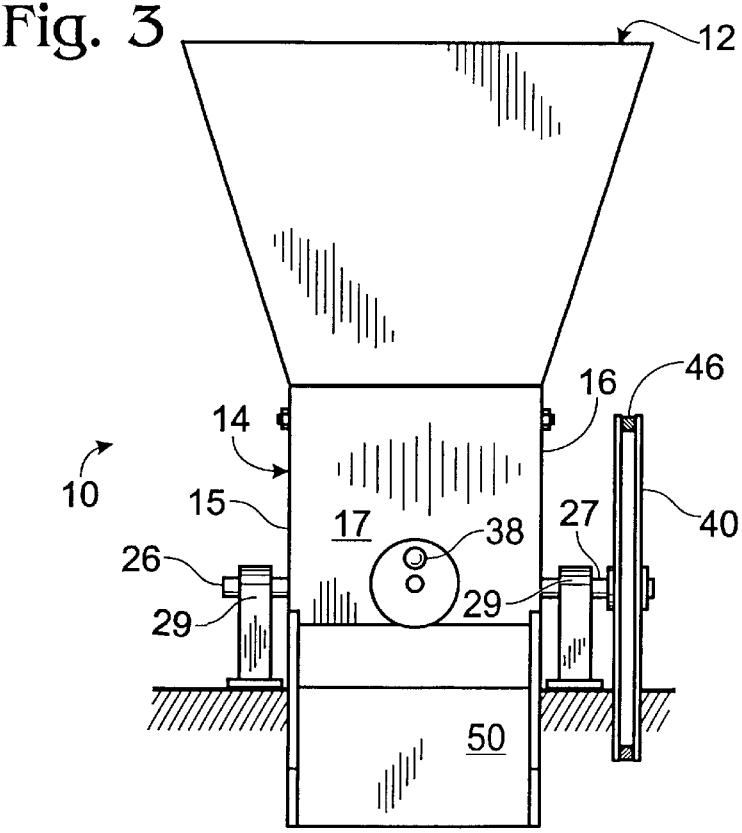
FIG. 3 is a front elevation view of the nut cracking apparatus of the present invention.

The nutcracking apparatus 10 of the present invention has a hopper 12 for receiving the nuts to be cracked. Hopper 12 communicates with the interior of housing 14. Housing 14 includes left sidewall 15, right sidewall 16, front wall 17 and rear wall 18.

Hammer plate 20 is located inside housing 14, and is attached at its upper end to axle 22. The outer ends of axle 22 are threaded and pivotally attached to opposing sidewalls 15 and 16 of housing 14, as best seen in FIG. 6. The threaded outer ends of axle 22 pass through sidewalls 15 and 16 and have locknuts 23 attached to their outer ends.

The area adjacent the lower edge of hammer plate 20 is in abutment with a camshaft 24. Camshaft 24 is positioned so that hammer plate 20 is at an angle to the vertical, and hammer plate 20 is, even when there are no nuts in hopper 12, retained in abutment with camshaft 24 by the force of gravity.

Camshaft 24 includes an axle 25 having a left outer end 26 and a right outer end 27. The right outer end 27 passes through an opening in right sidewall 16, is journaled in bearing 29 and attached to flywheel 40. The left outer end 26 of axle 25 passes through an opening in left sidewall 15 and is journaled in bearing 29'. Cam 28 is located on that portion of axle 26 located between the opposing sidewalls 15 and 16 of housing 14, and has a length substantially equal to the width of hammer plate 20.

Anvil plate 30 is located inside housing 14, and is attached at its upper end to axle 32. The outer ends of axle 32 are threaded and pivotally attached to opposing sidewalls 15 and 16 of housing 14, as best seen in FIG. 7. The threaded outer ends of axle 32 pass through sidewalls 15 and 16 and have locknuts 33 attached to their outer ends.

Screw jack 34 is threaded through hole 36 in front wall 17. The inner end of screw jack 34 is in abutment with an area of the outer surface of anvil plate 30 adjacent its lower edge. Handle 38 of screw jack 34 can be rotated clockwise to push the lower edge of anvil plate 30 towards the lower edge of hammer plate 20 or rotated counterclockwise to increase the spacing between the lower portions of the two plates. In any event, the distance between said upper portions of said hammer plate 20 and said anvil plate 30 is greater than the distance between said lower portions of said hammer plate and said anvil plate.

Flywheel 40 drive means includes an electric motor 43 having a drive shaft 44, a drive pulley 42 located on the outer end thereof, and pulley belt 46.

Alternatively, the outer end 27 of camshaft 24 can be directly connected to a variable speed electric motor or to an electric motor with a gear reduction box which can reduce the drive shaft speed to about 500 rpm.

A downwardly angled discharge chute 50 is in communication with the lower interior of housing 14, and receives and transfers cracked nuts into a suitable collection container, not shown.

Although not intended to be limiting, it has been found desirable to size drive pulley 42 and flywheel 40 to provide a drive pulley to flywheel rpm ratio of between about 3:1 and about 4:1, preferably about 3.5:1.

For many types of nuts it has been found that rotating drive pulley 42 at about 1750 rpm and flywheel 40 at about 500 rpm produces good results.

In operation, nuts to be cracked are placed into hopper 12 and fall between the hammer plate 20 and anvil plate 30 by gravity. Camshaft 24 is rotated by the flywheel which is driven by electric motor 43, pulley 42 and belt 46. Since camshaft 24 is forced into contact with the lower edge of hammer plate 20 by the force of gravity and by the forces generated by the nuts passing between hammer plate 20 and anvil plate 30, rotation of camshaft 24 causes hammer plate 20 to rapidly pivot back and forth about axle 22, towards and away from the anvil plate. The distance between the hammer plate and the anvil plate can be adjusted by the screw jack to optimize cracking the nutshells and minimize or eliminate damage to the nutmeat.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A nutcracking apparatus comprising:
   a housing having an interior formed by a front wall, rear wall, and opposing sidewalls;
   a hammer plate having an upper and lower portion, and means for pivotally attaching the upper portion thereof to said opposing sidewalls of said housing;
   a camshaft having first and second ends, at least a portion of said camshaft between said first and second ends being in abutment with a lower portion of said hammer plate;
   drive means attached to said first end of said cam shaft for rotating said cam shaft;
   an anvil plate having an upper and lower portion, said anvil plate being spaced from said hammer plate, and means for pivotally attaching the upper portion thereof to said opposing sidewalls of said housing;
   means for moving the lower portion of said anvil plate towards and away from the lower portion of said hammer plate to thereby adjust the spacing therebetween;
   a hopper for holding nuts, said hopper having a lower portion in communication with the interior of said housing and adapted to introduce said nuts by gravity between said hammer plate and said anvil plate to produce cracked nuts; and
   a discharge chute for receiving said cracked nuts and transferring them away from said nutcracking apparatus.

2. The nutcracking apparatus of claim 1 wherein each of said first and second ends of said camshaft are journaled in a bearing.

3. The nutcracking apparatus of claim 2 wherein said bearings are located outside and adjacent to said opposing sidewalls of said housing.

4. The nutcracking apparatus of claim 1 wherein said drive means includes a flywheel attached to said first end of said camshaft, an electric motor having a drive shaft, a drive pulley located on the outer end of said drive shaft, and a pulley belt extending between said drive pulley and said flywheel.

5. The nutcracking apparatus of claim 4 wherein said electric motor is selected to provide a drive shaft rotational velocity of about 1750 rpm, and said drive pulley and said flywheel are sized to provide a drive pulley to flywheel rpm ratio of between about 3:1 and about 4:1.

6. The nutcracking apparatus of claim 5 wherein said rpm ratio is about 3.5:1.

7. The nutcracking apparatus of claim 1 wherein said means for moving the lower portion of said anvil plate towards and away from the lower portion of said hammer plate is a screw jack.

8. The nutcracking apparatus of claim 1 wherein said means for pivotally attaching the upper portion of said hammer plate to said opposing sidewalls of said housing includes an axle attached to said upper portion of said hammer plate, said axle having first and second ends extending through said opposing sidewalls of said housing and pivotally attached thereto.

9. The nutcracking apparatus of claim 1 wherein said means for pivotally attaching the upper portion of said anvil plate to said opposing sidewalls of said housing includes an axle attached to said upper portion of said anvil plate, said axle having first and second ends extending through said opposing sidewalls of said housing and pivotally attached thereto.

10. The nutcracking apparatus of claim 1 wherein the distance between said upper portions of said hammer plate and said anvil plate is greater than the distance between said lower portions of said hammer plate and said anvil plate.

* * * * *